Oct. 6, 1964  I. FAIT  3,151,662
COMBINATION VISOR AND SUN SHADE DEVICE
Filed May 1, 1962                                    2 Sheets-Sheet 1

INVENTOR.
IRWIN FAIT

Oct. 6, 1964 I. FAIT 3,151,662
COMBINATION VISOR AND SUN SHADE DEVICE
Filed May 1, 1962 2 Sheets-Sheet 2

INVENTOR.
IRWIN FAIT
BY Salvatore G. Militano
attorney

United States Patent Office 3,151,662
Patented Oct. 6, 1964

3,151,662
COMBINATION VISOR AND SUN
SHADE DEVICE
Irwin Fait, 4531 Post Ave., Miami Beach, Fla.
Filed May 1, 1962, Ser. No. 191,592
2 Claims. (Cl. 160—32)

This invention relates to sun visors but is more particularly directed to a combination visor and sun shade device for vehicles such as convertible automobiles, open boats and the like.

A principal object of the present invention is to provide a sun shade device which affords a person protection from the sun's rays without sacrificing the freedom of air flow in a convertible automobile, open boat and the like.

Another object of the present invention is to provide a sun shade for convertible automobiles, boats, etc., which device is compact and used as a visor having a plurality of blade sections therein which open fan-wise to effect a large area of shade for use as a sun shade when desired.

A further object of the present invention is to provide a combination visor and sun shade for convertible automobiles, etc., which device is simple in construction and inexpensive in cost and easily converted to its expanded and shade producing condition.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
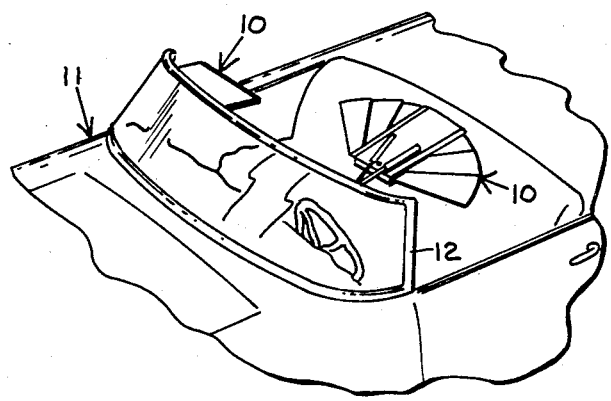
FIGURE 1 is a fragmentary perspective view of a convertible automobile with two combination visor and sun shade devices constructed in accordance with my invention and shown in both of the visor and sun shading positions.

Referring to the drawings wherein like numerals are used to designate similar parts throughout the several views, the numeral 10 refers to a combination visor and sun shade device constructed in accordance with my invention and shown mounted in position on a convertible automobile 11. The combination visor and sun shade is particularly useful in all types of vehicles such as automobiles, boats, etc. that have wind or spray shields in order to provide protection against the sun's rays without preventing the free flow of air effected by the moving vehicle and flowing over the occupants of the vehicle as shown by the device 10 on the driver's side of the vehicle 11. When the device 10 is in its retracted condition as shown by the device 10 on the left of the vehicle 11 in FIGURE 1, it is useful as a conventional visor to prevent the sun's rays from causing a glare to the eyes of the occupants.

My combination visor and sun shade 10 is mountable on a top portion of a wind shield 12 being provided with a bracket 13 which is fastened by screws or bolts to the frame of the windshield 12. The bracket 13 is provided with a universal socket 14 and an eye bolt 15. The socket 14 forms a universal joint for a ball 16 rotatably mounted therein and having a support arm 17 secured thereto. The support arm 17 is telescopically fitted within a tubing 18 mounted on the outer surface of a top wall member 19 of the device 10. A bottom wall member 20 is mounted in spaced parallel relation with the top wall member 19 with end walls 21 and 22 forming the housing. Side walls 23 are pivotally mounted as by hinges 24 to the top wall member 19 and fastened at its closed position by a flap 25 which engages a lock pin 26 mounted on the outer surface of the bottom wall member 20.

Extending between the wall members 19 and 20 is a pivot bolt 27 positioned medially on the device 10 adjacent the end wall 22. Pivotally mounted on the pivot bolt 28 is a plurality of fan sections 28, 29 and 30 forming two groups, an upper group and a lower group. Although three fan sections 28, 29 and 30 are shown herein, any desired number may be used as determined by the size of the visor 10 and the area of the shade to be effected.

Figure 2:
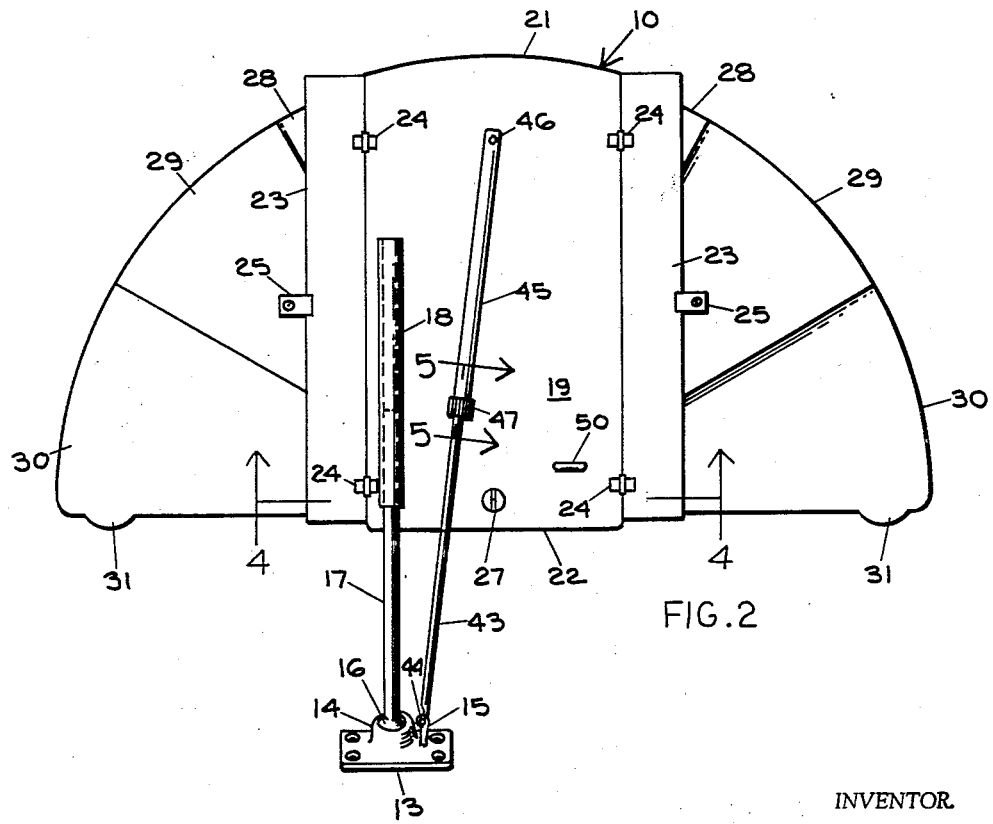
FIGURE 2 is a to plan view of my combination visor and sun shade device shown in the open position.
Figure 3:
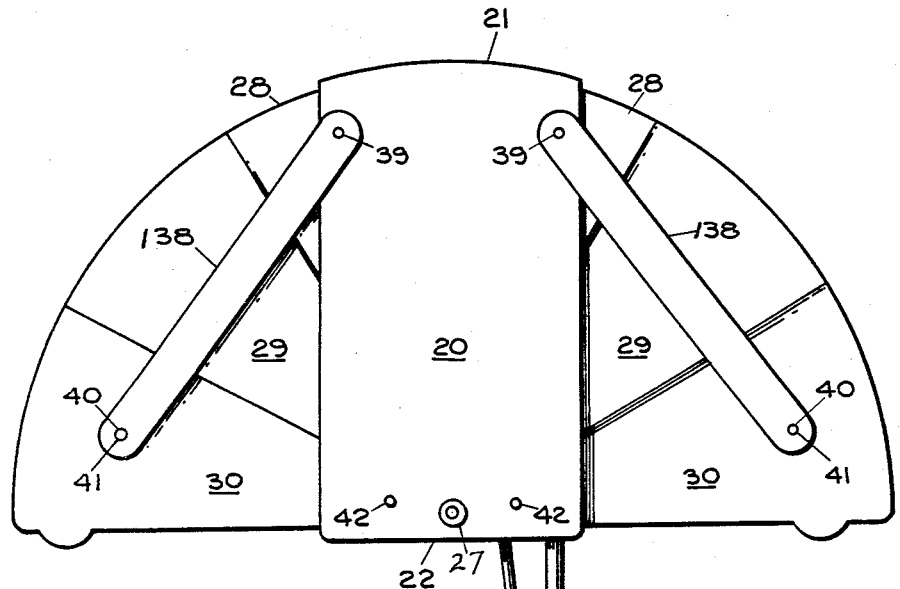
FIGURE 3 is a bottom plan view thereof.
Figure 4:
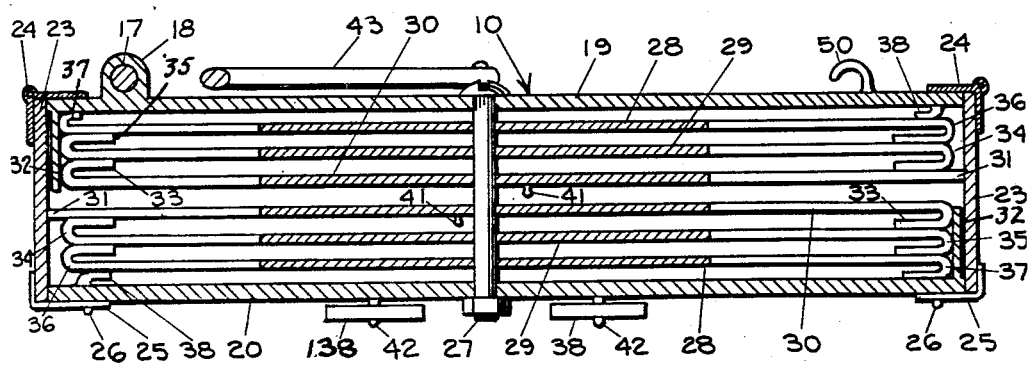
FIGURE 4 is a cross sectional view taken along the line 4—4 of FIGURE 2 with the fan sections shown in their contained or retracted position.
Figure 5:
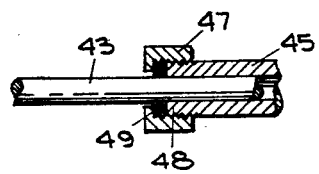
FIGURE 5 is a cross sectional view of the locking member taken along the line 5—5 of FIGURE 2.

The lower and upper groups of fan sections 28, 29 and 30 are pivotally mounted on the pivot pin 27 to swing on each side respectively of the device 10, the upper group of the fan sections swinging to the right as shown by FIGURES 2 and 4 while the lower group of fan sections 28, 29 and 30 pivot to the left side of the device. To prevent the upper and lower groups of fan sections 28, 29 and 30 from swinging out of the device 10 in the wrong direction stop members 32 are secured to the top and bottom wall members 19 and 20 respectively as shown by FIGURE 4.

Both of the fan sections 30 are provided with a tab 31 to permit a person to grasp the fan section 30 and pull the latter to cause it to pivot out of the housing on the pivot pin 27. At the other end of the fan sections 30 there is a hook portion 33 which is adapted to engage a similar hook portion 34 positioned at the opposite edge of the fan sections 29 when the fan sections have been pivoted to their extended position. The other edge of the fan sections 29 are provided with a hook portion 35 which engages a hook portion 36 positioned on the opposite edge of the fan sections 28. The other edge of the fan sections 28 are provided with a hook portion 37 which engages a similar hook portion 38 mounted on the inner surfaces of both of the top and bottom wall members 19 and 20.

It can readily be seen by this construction of the fan sections 28, 29 and 30 with the interengaging hook portions 33, 34, 35, 36, 37 and 38 by grasping the tabs 31 and pulling outwardly thereon the fan sections 28, 29 and 30 will pivot on the pivot pin 27, slide past the side walls 23 which are held in their open position and when the fan sections 28, 29 and 30 have arrived at their extended position the hook portions 33 and 34, 35 and 36, 37 and 38 will have become engaged.

Means are provided for locking together the extended fan sections 28, 29 and 30 comprising a pair of arm members 138 each pivotally mounted as at 39 to the bottom wall member 20 in proximity of the end wall member 21. The other end of each of the arm members 138 is provided with a bore 40 for receiving a snap-on pin 41 mounted on the lower surface of each of the fan sections 30. When the fan sections 28, 29 and 30 are about to be brought to their retracted positions, the free end of arm members 138 are lifted away from the fan section 30 to permit the snap-on pins 41 to be released from the bores 40. The fan sections 28, 29 and 30 are then swung on their pivot pin 27 back to their housed position and the side walls members 23 are swung downwardly on their hinges 24 to their closed position while the flaps 25 are made to engage the lock pins 26. The arm members 138 are now swung on their pivot pins 39 in the direction of the pivot pin 27 until the free ends of the arm members 38 have arrived at the position of snap-on pins 42 mounted on the outer surface of the bottom wall member 20. The snap-on pins 42 will be received by the bores 40 on the free end of the arm members 138 to lock the arm members 138 in position.

Means are likewise provided to lock the combination visor and sun shade 10 in any desired position against the forces of air flowing therealong and to any vibrations that the vehicle may subject the device 10. Said means consists of an extension rod 43 having a hook 44 at one end for engaging the eye bolt 15. The extension rod 43 is telescopically mounted in a tubular member 45 which has one end pivoted as at 46 to the top wall member 19. A cap 47 is threadedly mounted at the free end of the tubular member 45 with an expandable washer 49 positioned between the cap 47 and the free end of the tubular member 45. When the cap 47 is hand tightened on the tubular member 45, the expandable washer 49 will be compressed in thickness and expand against the extension rod 43 to lock the rod 43 and the tubular member 45 together.

When the device 10 is not in use as a sun shade, the cap 47 is loosened to free the extension rod 43 in the tubular member 45. The hook 44 is disengaged from the eye bolt 15 and the extension rod 43 is slid inwardly of the tubular member 45. The tubular member 45 is swung on its pivot 46 to a position wherein the extension rod 43 is engaged by a loop member 50 mounted on the wall member 19 and maintained there while out of use and until it is desired to use the device 10 as a sun shade.

The cap 47 is then loosened to permit the extension rod 43 to be pulled outwardly of the tubular member 45 until the hook 44 is made to engage the eye bolt 15. The device 10 is swung on its ball and socket joint 14, 16 until the shade is cast as desired with the fan sections 28, 29 and 30 locked in their extended positions. Then the lock cap 47 is tightened and the rod 43 becomes locked in position in the tubular member 45.

What I claim as new and desire to secure by Letters Patent of the United States is:

1. A combination visor and sun shade device comprising a pair of wall members mounted in substantially parallel and spaced relation, a pivot pin mounted on said wall members in proximity of one end thereof, a plurality of fan sections pivotally mounted on said pivot pin between said wall members, said fan sections forming two groups, stop means mounted along one edge of one of said wall members preventing the pivotal movement of one of said group of fan sections in one direction, stop means mounted along on opposite edge of the other of said wall members preventing the pivotal movement of the other of said group of fan sections in the opposite direction, a tab mounted on one edge of one of said fan sections of each of said groups, interengaging means mounted on the other edge of said last named fan sections and on all of the edges of the remaining fan sections, all of said interengaging means extending substantially the full length of said fan sections, further interengaging means mounted on each of said wall members adapted to be engaged by one of said first named interengaging means when said fan sections have been pivoted outwardly of said wall members, a pair of elongated arm members pivotally mounted at one end on one of said wall members, means removably securing the other end of each of said elongated arm members to said one of said fan sections of each of said group for securing said fan sections in an extended position, a bracket, a tubular member mounted on one of said wall members, an elongated rod telescopically mounted in said tubular member, universal joint means securing said rod and said bracket, a further tubular member pivotally mounted at one end to said one of said wall members, a further rod slidably mounted in said further tubular member, releasable means securing one end of said further rod and said bracket and locking means mounted on the other end of said further tubular member and engaging said further rod for locking said combination visor and sun shade device in any desired position.

2. A combination visor and sun shade device comprising a pair of wall members mounted in substantially parallel and spaced relation, a pivot pin mounted on said wall members in proximity of one end thereof, a plurality of fan sections pivotally mounted on said pivot pin between said wall members, said fan sections forming two groups, stop means mounted along one edge of one of said wall members preventing the pivotal movement of one of said group of fan sections in one direction, stop means mounted along an opposite edge of the other of said wall members prevent the pivotal movement of the other of said group of fan sections in the opposite direction, a tab mounted on one edge of one of said fan sections of each of said groups, interengaging means mounted on the other edge of said last named fan sections and on all of the edges of the remaining fan sections and extending substantially the full length of said fan sections, further interengaging means mounted on each of said wall members adapted to be engaged by one of said first named interengaging means when said fan sections have been pivoted outwardly of said wall members, a pair of elongated arm members, pivotally mounted at one end on one of said wall members, means removably securing the other end of each of said elongated arm members to said one of said fan sections of each of said group for securing said fan sections in an extended position, a bracket, a tubular member mounted on one of said wall members, an elongated rod telescopically mounted in said tubular member, universal joint means securing said rod and said bracket and further means operatively connecting said bracket and said one of said wall members for securing said device in any desired position.

References Cited in the file of this patent

UNITED STATES PATENTS

| | | |
|---|---|---|
| 300,930 | White | June 24, 1884 |
| 438,238 | Jefferies et al. | Oct. 14, 1890 |
| 1,380,829 | Nakagawa | June 7, 1921 |
| 1,444,522 | Pedlar | Feb. 6, 1923 |
| 1,464,876 | King | Aug. 14, 1923 |